United States Patent
Tromey

(10) Patent No.: US 7,941,792 B2
(45) Date of Patent: May 10, 2011

(54) SYSTEM AND METHOD FOR COMPILING PROGRAM CODE AHEAD OF TIME

(75) Inventor: Thomas Joseph Tromey, Boulder, CO (US)

(73) Assignee: Red Hat, Inc., Raleigh, NC (US)

( * ) Notice: Subject to any disclaimer, the term of this patent is extended or adjusted under 35 U.S.C. 154(b) by 1675 days.

(21) Appl. No.: 11/187,666

(22) Filed: Jul. 22, 2005

(65) Prior Publication Data

US 2007/0022411 A1     Jan. 25, 2007

(51) Int. Cl.
*G06F 9/44* (2006.01)
*G06F 9/45* (2006.01)

(52) U.S. Cl. ........ 717/148; 717/126; 717/131; 717/141; 717/143; 717/144; 717/152

(58) Field of Classification Search .......... None
See application file for complete search history.

(56) References Cited

U.S. PATENT DOCUMENTS

| | | | |
|---|---|---|---|
| 5,553,239 A | 9/1996 | Heath et al. | |
| 5,828,876 A | 10/1998 | Fish et al. | |
| 6,918,126 B1 * | 7/2005 | Blais | 719/332 |
| 7,171,655 B2 * | 1/2007 | Gordon et al. | 717/146 |
| 2003/0023856 A1 * | 1/2003 | Horne et al. | 713/187 |

OTHER PUBLICATIONS

Adams, Steve. Oct. 1999. *Oracle8i Internal Services: for Waits, Latches, Locks, and Memory*. O'Reilly & Associates, Inc. Sebastopool, California.
Shah, Jay. 1991. "VAXclusters and Other High-Availability Systems" *VAXclusters: Architecture, Programming and Management*. McGraw-Hill, Inc. p. 57-99.
Kenah, Lawrence J. et al. 1984. "VAX/VMS Lock Manager." *VAX/VMS Internals and Data Structures*. Digital Press. p. 244-263.

* cited by examiner

*Primary Examiner* — Chuck O Kendall
(74) *Attorney, Agent, or Firm* — Wilmer Cutler Pickering Hale and Dorr LLP

(57) ABSTRACT

A system is disclosed for compiling program code. The system provides a compiler that includes a static verifier and a runtime verifier. The static verifier performs static checks on the program code and produces object code corresponding to the program code. The runtime verifier receives the object code and performs dynamic checks on the object code in a platform dependent environment. The resulting object code can subsequently be executed.

34 Claims, 5 Drawing Sheets

Figure 2
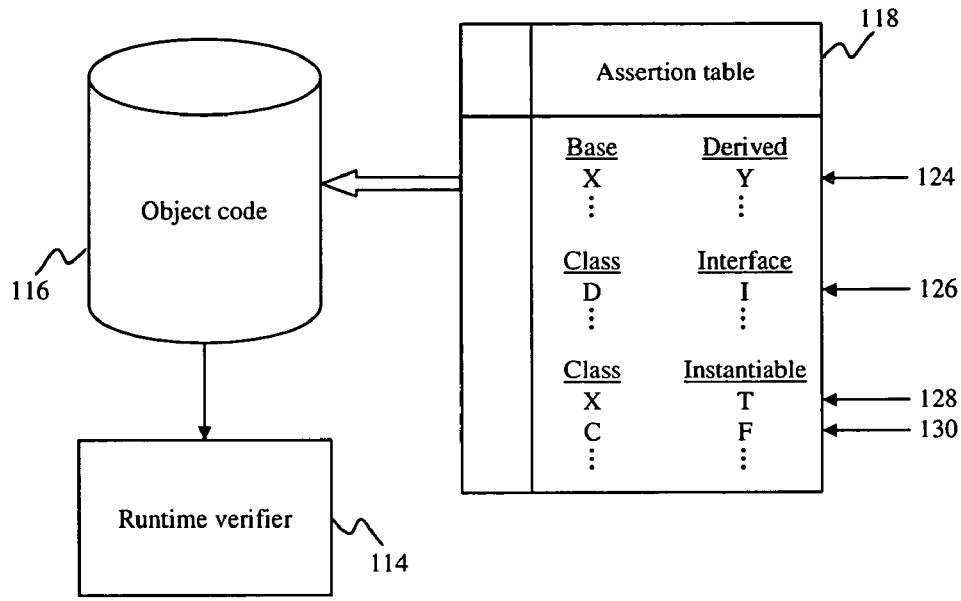
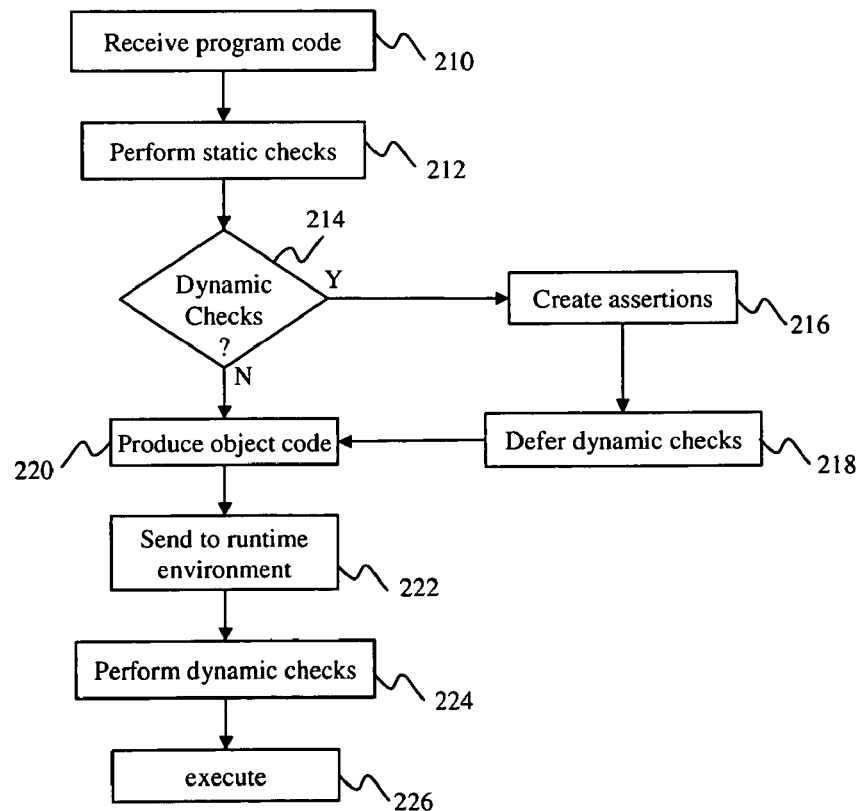
Figure 3

US 7,941,792 B2

SYSTEM AND METHOD FOR COMPILING PROGRAM CODE AHEAD OF TIME

BACKGROUND OF THE INVENTION

1. Technical Field

The present invention relates to computer programming and, more particularly, to runtime type verification of pre-compiled code in programming languages.

2. Description of the Related Art

There exist various programming languages that can be used to write application software for computer systems. Some of the more popular languages currently in use include Java, C++, and C#, to name a few. The Java programming language, for example, is capable of producing a machine-independent compiled format known as a class file. The Java programming language further provides a machine independent environment within which the compiled code (or class file) is run. This environment is known as the Java virtual machine (JVM). At runtime, the Java virtual machine utilizes a bytecode verifier to examine the contents of a class file and ensure that the contained bytecode does not violate type safety or other constraints imposed by the virtual machine.

In a traditional Java virtual machine, there are a number of verification checks that must be performed at runtime. This is often done by modeling the control flow in the method bodies, and examining the various type assumptions made by the methods. It is essential that these verification checks be performed within the appropriate runtime context (or environment). Conversely, it can be wasteful in both space and time to maintain a copy of, and redundantly verify, bytecode corresponding to a compiled method. In the context of compiling source code, for example, only implicit downcasts and class instances made in the source code need to be verified at runtime. Thus, all other checks can be performed prior to runtime in order to reduce the amount of verification necessary at runtime. This can sometimes present a problem for compilers that seek to optimize and improve execution of the program.

In Java, for example, the ability to run programs in a machine independent environment can sometimes allow the Java virtual machine to execute untrusted code. In order to maintain type safety during runtime, a Java virtual machine performs bytecode verification to emulate the actions of various bytecode instructions within a method. If the bytecode verification is successful, then the method is presumed to be type-safe. However, various situations can arise where the bytecode successfully passes verification in one context (or machine environment), but causes harmful results when the same bytecode is executed within another context.

FIG. 6 is a flow diagram illustrating one specific manner in which certain program code can be executed according to convention methods. At step 410, the program source code (or program code) is received. According to the example shown in FIG. 6, the program source code used is Java source code. At step 412, the system compiles the source code to produce Java bytecode at 414. The Java bytecode corresponds to a type of machine executable code that is specific to the Java virtual machine. At step 416, the bytecode is executed within a Java virtual machine. While in the Java virtual machine, all verification checks for the bytecode are performed at 418. Execution of the bytecode continues, and verification continues until the program ends.

At least one problem encountered when compiling and running programs according to such conventional methods is the difficultly involved in testing the program code. Since programming languages such as Java are intended to be portable, they must be able to function substantially identically on different operating systems and/or platforms. As previously discussed, however, program code that is compiled and tested in one environment can sometimes affect the security parameters within which the program is being executed when the program is moved to a different environment and/or context. This can oftentimes be the result of improper verification within the runtime environment. Furthermore, the time required to perform redundant verifications at runtime can significantly affect execution speed.

SUMMARY OF THE INVENTION

The present invention allows for increased efficiency when compiling program code to native (or object) code, by splitting the verification process into two steps. This split allows all static properties of verification to be performed once, e.g., at compile time. All verifiable assumptions that must be made at runtime are deferred and handled as a sequence of efficient runtime (or dynamic) checks.

In accordance with one or more embodiments, the present invention provides a compiler for a programming language that comprises a static verifier and a runtime verifier. The static verifier performs static checks on the program code and defers dynamic checks. The static verifier then produces object code corresponding to the program code. The runtime verifier receives the object code and performs dynamic checks on the object code in a platform dependent environment. Accordingly, the program code can be verified within the environment it will be run. Further, efficiency can be improved because static checks are not redundantly performed at runtime.

According to various implementations of the invention, the static verifier performs static checks by checking the validity of classes defined in the program code. Furthermore, a type assertion, or instantiability assertion, is created for each dynamic check that is deferred. The static verifier can also produce one or more shared libraries based on the object code.

According to one or more embodiments of the present invention, program code is compiled by first being received within a runtime environment. Static checks are performed on the program code and shared libraries containing object (or native) code are generated. The native code is then executed in the runtime environment. According to such an embodiment, the native code can be efficiently produced and executed.

According to various specific implementations of the present invention, an initial attempt is made to compile the program code to native code for execution in the runtime environment. If any static failures occur, then a static failure assertion is created for each static check that fails. Dynamic checks on the program code are deferred until all static checks are completed. The program code is then compiled to produce object code. Dynamic checks are performed on the object code within the runtime environment prior to execution.

These, and various features of novelty which characterize the invention, are pointed out with particularity in the appended claims forming a part of this disclosure. For a better understanding of the invention, its operating advantages, and the specific benefits attained by its uses, reference should be had to the accompanying drawings and embodiments of the invention.

BRIEF DESCRIPTION OF THE DRAWINGS

FIG. 2 is a block diagram illustrating certain assertions that can be made while verifying program code.

FIG. 3 is a flowchart illustrating the steps performed to compile program code according to one or more embodiments of the present invention.

DETAILED DESCRIPTION OF THE INVENTION

Figure 1:
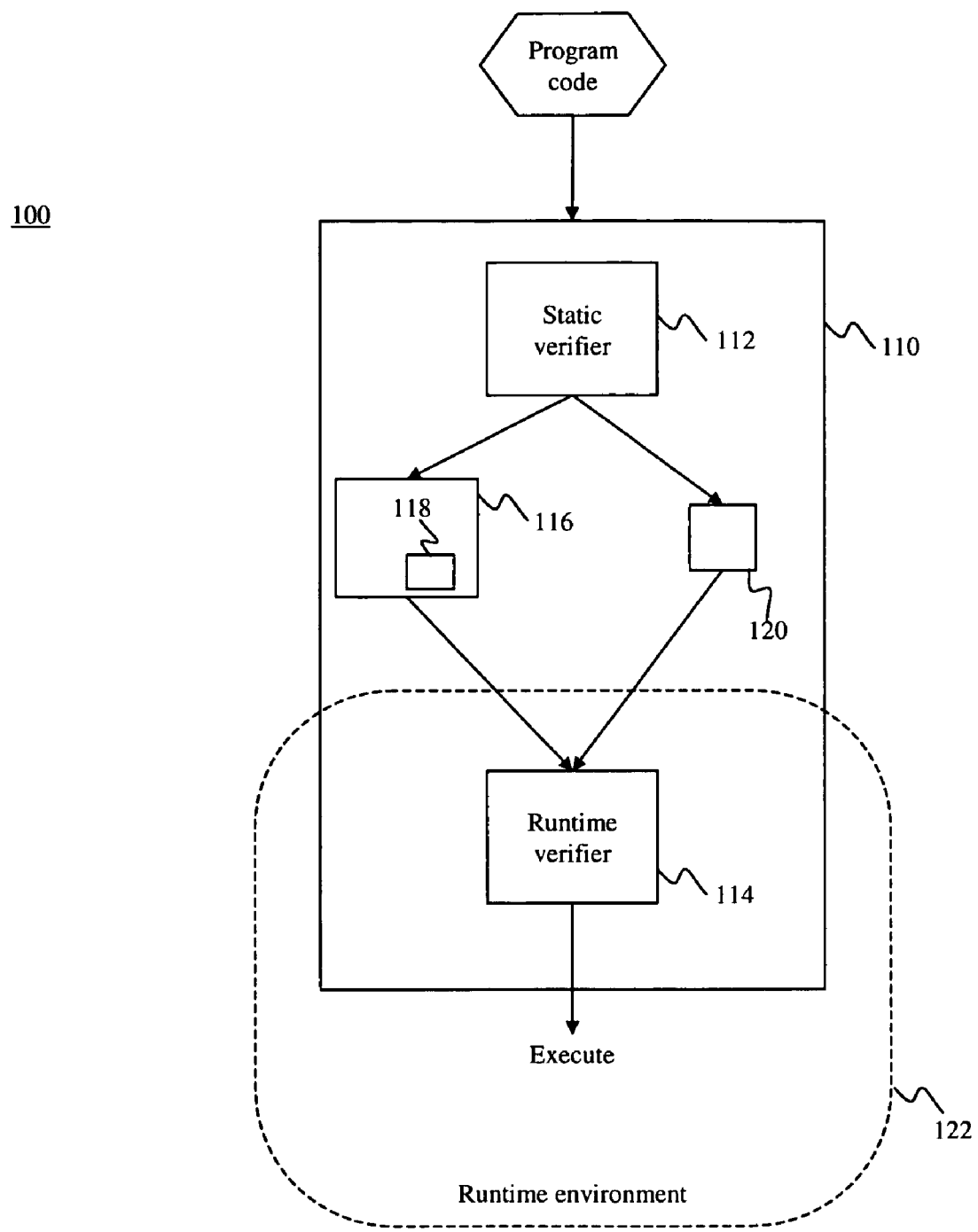
FIG. 1 is block diagram illustrating an environment for compiling program code in accordance with at least one embodiment of the present invention.

FIG. 1 is block diagram illustrating an environment for compiling program code in accordance with at least one embodiment of the present invention. The environment 100 of FIG. 1 includes a compiler 110 having a static verifier 112 and a runtime verifier 114. The compiler 110 receives program code and produces executable code that can run in a runtime environment 122. The static verifier 112 reviews the program code that is received by the compiler 110 and performs various static checks on the program code. At the same time, the static verifier 112 determines if there are any dynamic checks that should be made. If any dynamic checks are necessary, then the static verifier 112 defers the dynamic checks, and creates an assertion for each particular dynamic check. The assertions made by the static verifier 112 can be stored, for example, in an assertion table 118, as will be discussed in greater detail below. Once all the static checks are complete, the static verifier 112 compiles the source code to produce object code 116 that contains the assertion table 118. The static verifier 112 can also produce one or more shared libraries 120 that correspond to the object code 116.

Referring additionally to FIG. 2, the assertion table 118 can include entries 124-130 for a plurality of assertions. For example, entry 124 indicates that an assertion is being made that the class Y is derived from base class X. Entry 126 indicates that class D implements interface I. Entries 128 and 130 show assertion for the instantiability of class X and class C. This entry also includes a Boolean parameter which specifies whether class X can be instantiated. Conversely, class C cannot be instantiated. In order to create an instance of a class, for example, the class must have certain properties. Under most circumstances, however, these properties can only be determined within the runtime environment. For example, if class X in entry 128 of the assertion table 118 were an abstract class, then the value of its instantiability parameter would be "false" because instances of an abstract class cannot be created. It should be noted that other types of assertions can be included in the assertion table.

According to one or more embodiments of the present invention, the static verifier 112 does not check these assertions. Rather, such assertions are assumed to be true, and all checks are deferred until execution time. This allows the verification process to take place within the environment and/or context that the program code will be executed. The object code 116 and type assertions are then provided to the runtime verifier 114. The runtime verifier 114 performs all of the dynamic tests that depend on the particular runtime environment being used. After the dynamic tests are performed and confirmed valid, the runtime verifier 114 allows the program to execute within the runtime environment 122.

FIG. 3 is a flowchart illustrating steps performed in compiling program code in accordance with one or more embodiments of the present invention. At step 210, the static verifier receives the program code. According to various embodiments of the present invention, the program code can be in various forms. For example, the program code can be written in any of various programming languages such as Java, C, C++, C#, etc. The program code can also be in the form of any high level programming language or object oriented programming language.

At step 212, static checks are performed on the program code. The static checks correspond to verification of various static constraints that appear in the program code. For example, static constraints can include certain declarations that indicate a fixed number of stack slots will be used by a method and/or local variable. Such relationships depend only on the number of stack slots being reserved. For example, if a method reserves five stack slots, then the static verifier will check to see if that declaration remains true, i.e., the method only uses five. If the method actually uses six stack slots, then the static verifier will identify this as a constraint violation.

At step 214, it is determined whether there are any dynamic constraints that need to be checked. The dynamic constraints correspond to various non-static constraints. For example, according to at least one embodiment of the present invention, verification of any type relationships can be considered non-static (i.e., dynamic). If there are any dynamic relationships, then at step 216 an assertion is created for each dynamic constraint. The dynamic checks are deferred at step 218 so that they can be performed within the appropriate runtime environment at step 224. Control then passes to step 220 so that object code can be produced. If, at step 214, it was determined that there are no dynamic constraints to be checked, then control passes directly to step 220 to produce the object code.

At step 222, the object code is sent to the appropriate runtime environment. The runtime environment can correspond, for example, to a platform dependent environment (e.g., machine or operating system specific) within which the object code will be executed. At step 224, the dynamic checks are performed on the object code. This can be done, for example, by accessing the assertion table, examining each assertion made by the static verifier, and testing the validity of each examined assertion. The runtime verifier could check an assertion, for example, to determine whether it is actually valid to call a particular method on an object, or whether it is valid to lookup a particular field in an object. Other dynamic checks can include, for example, determining whether it is valid to cast one object to a different type. Once the dynamic checks have been performed then the program can be executed at step 226.

According to various embodiments of the invention, various techniques can be applied when building the assertion table in order to improve the runtime verifier's ability to perform dynamic checks. Furthermore, the assertion table can be constructed such that each entry is unique, thereby requiring only a single check on each constraint. The assertion table can also include an extra layer of indirection so that a given class is looked up only once per table. According to further embodiments of the invention, the entries in the assertion table can be such that all classes inherit from objects. This would eliminate entries in the form "X" extends "Object." Special treatment can also be given to array classes such that, for example, all casts from an array class to any non-array class can be handled statically.

Figure 4:
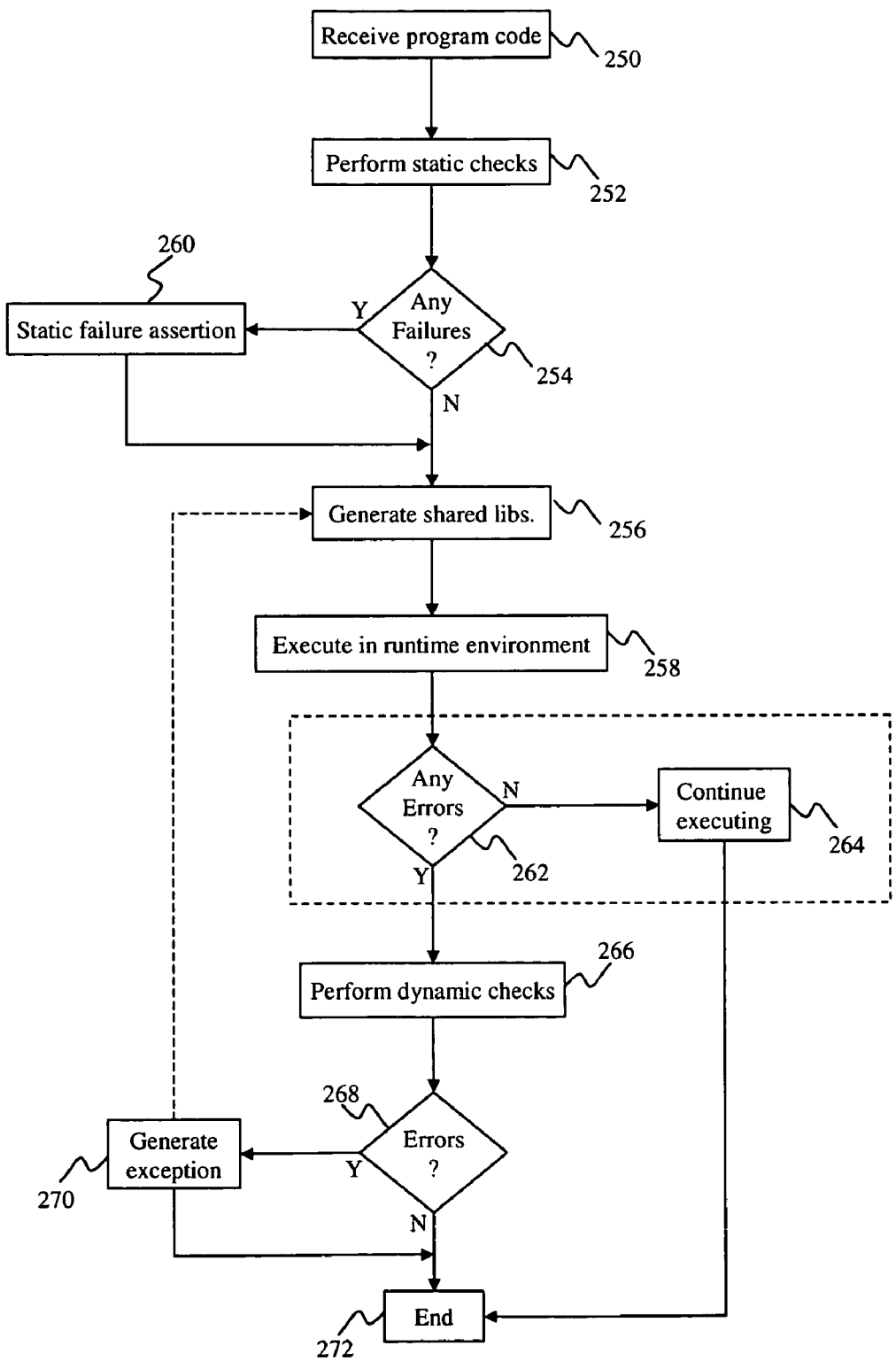
FIG. 4 is a flowchart illustrating the steps performed to compile program code according to further embodiments of the present invention.

FIG. 4 is a flowchart illustrating the manner in which program code can be compiled in accordance with at least one embodiment of the present invention. At step 250, the program code is received. At step 252, static checks are performed on the program code. At step 254, it is determined whether any failures have occurred while performing the static checks. If no failures have occurred, then one or more shared libraries are created at step 256. As previously indicated, the shared libraries contain native and/or object code. The shared libraries are executed in the runtime environment at step 258. Alternatively, if failures occur while performing the static checks, then control passes to step 260. A static failure assertion is then created for each failure that has been detected. The static failure assertion is used to specify that a particular test will always fail. This assertion can subsequently be stored in the assertion table.

According to one or more further embodiments of the invention, execution of native code contained in the shared libraries can be optionally monitored. As shown in FIG. 4, for example, at step 262, it is determined if any errors have been generated while executing the native code. If no errors have been generated, then execution of the native code simply continues, as indicated at step 264. If any errors are generated, however, then dynamic checks are performed on the native code at step 266. According to one or more embodiments of the present invention, dynamic constraints are presumed valid and checked only if, and when, necessary.

For example, at step 268, it is determined whether errors have occurred while executing the native code. If any errors have occurred, then control passes to step 270 where an exception is generated. Control would then pass to step 272 where the process ends. Alternatively, if no errors are generated at step 268, the process would also end. According to one or more embodiments of the invention, control can optionally return to step 258. At this point, new shared libraries would be produced using both the dynamic and static assertions. The shared libraries (containing object and/or native code) would then be compiled and executed as previously discussed.

Figure 5:
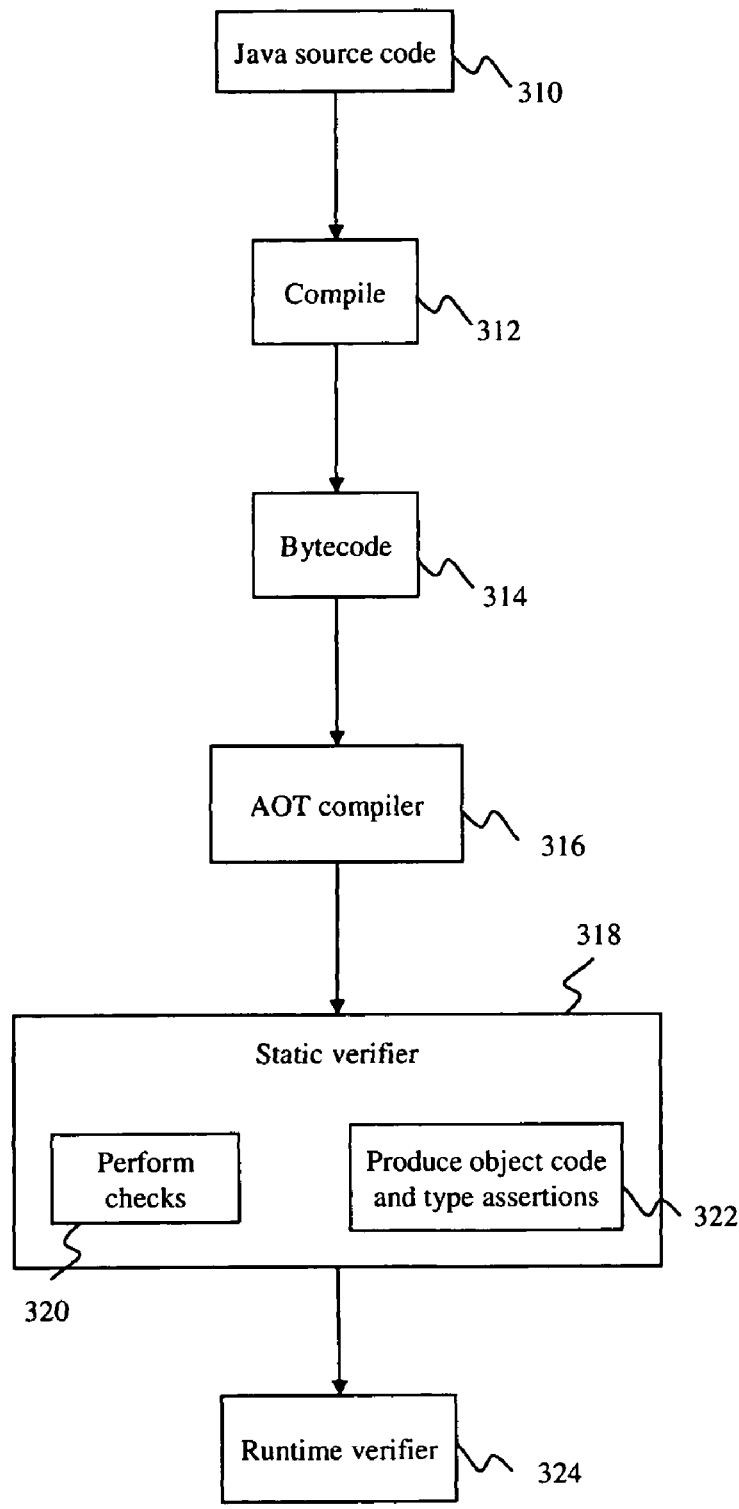
FIG. 5 is a flowchart illustrating the steps performed to compile program code according to additional embodiments of the present invention.
Figure 6:
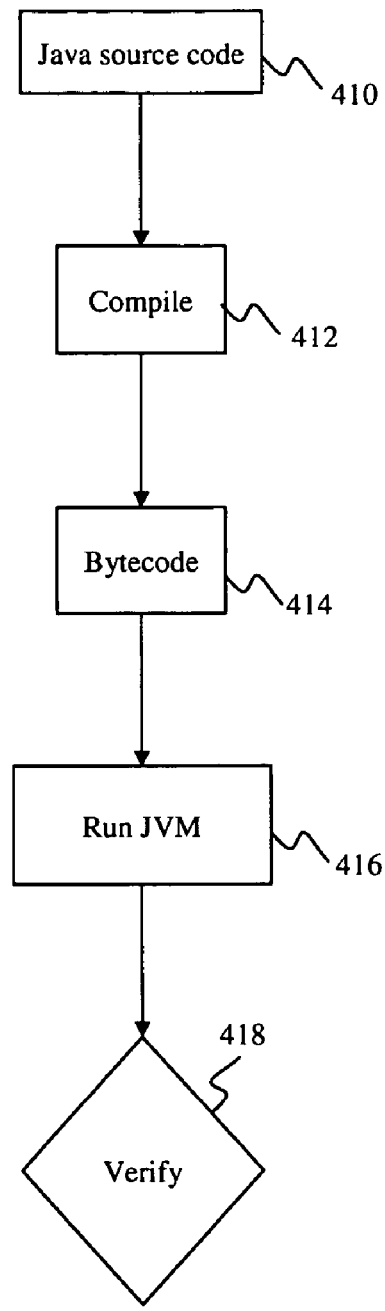
FIG. 6 is a flow diagram illustrating one conventional method of compiling program code.

FIG. 5 is a flowchart illustrating the manner in which program code can be executed according to further embodiments of the present invention. At step 310, Java source code is received. The Java source code is compiled at step 312 to produce bytecode at step 314. At step 316, an ahead of time compiler, such as the compiler of the present invention, receives the Java bytecode. An ahead-of-time (AOT) compiler is one which compiles bytecode to object code before starting to run the program. Under certain conditions, such a compiler can reduce the number of verification checks required at runtime by performing certain verification checks ahead of the runtime environment. At step 318, the compiler performs the verification checks on the Java bytecode. According to at least one embodiment of the present invention, the static verifier performs the verification process in a two-step manner. At step 320, the static verifier performs various checks such as, for example, instantiability checks, implicit downcasts, etc. These checks would correspond to the static checks and any other checks that need to be performed based on the specific platform and/or environment (i.e., different operating systems, processors, etc.). Object code containing the various type assertions is then produced at step 322. The object code and type assertions can then be passed to the runtime verifier at step 324 so that the dynamic checks can be performed. Depending on the precise programming language and/or environment, additional checks could also be performed by the static verifier.

It should be noted that the program code can be received from various sources including external sources, storage media contained within a computer system, removable storage media, physical memory, removable memory, etc. Furthermore, once the object code has been compiled and the dynamic checks have been performed, it can be transferred to physical memory within the computer system, removable storage, and/or permanent storage within the computer system. For example, the object code can be stored in the computer's fixed drive and retrieved when necessary for execution within the runtime environment. Furthermore, the object code can be transmitted to external computer systems across one or more networks.

The compiler of the present invention may be implemented in a variety of forms, such as software or firmware, running on a general purpose computer or a specialized computer system such as, for example, a personal computer, workstation, server, etc. The software can be provided in any machine-readable medium, including magnetic or optical disk, or in memory. In order to perform certain functions of the invention, it may be necessary to retrieve information from one or more external sources or input devices such as, for example, removable storage media, sensors, etc. Information can also be retrieved from various storage devices that can be either internally or externally located. Upon completion of the execution phase, the present invention can output information to various sources such as a display device, magnetic storage device, non-volatile memory devices, volatile memory, and/or printers. The information can further be transmitted to remotely located devices using various communication methods and networks such as wired, wireless, satellite, optical, etc. Furthermore, the present invention is utilizable in conjunction with a computer system that operates software which may require periodic updates. The present invention can be implemented on various computer systems and/or servers using any operating system including, Windows, MacOS, Unix, Linux, etc., and can be applied to any programming language.

It is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

Such embodiments are provided by way of explanation of the invention, which is not intended to be limited thereto. In fact, those of ordinary skill in the art will appreciate, upon reading the present specification and viewing the present drawings, that various modifications and variations can be made. For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A compiler for program code comprising:
   a static verifier stored on a computer storage medium of a computer for receiving program code and producing object code corresponding to said program code, said static verifier performing static checks on said program code,
said static verifier deferring dynamic checks, and
said static verifier producing object code containing information regarding said static checks and said dynamic checks; and
a runtime verifier stored on the computer storage medium for performing dynamic checks on said object code in a platform dependent environment
wherein said static checks include validity checks on different classes defined in said program code to determine if said classes are valid; and
wherein said static verifier creates a static failure assertion for any static check that fails.

2. The compiler of claim 1, wherein said static verifier receives said program code as a plurality of class files.

3. The compiler of claim 1, wherein said static verifier produces one or more shared libraries.

4. The compiler of claim 1, wherein said program code is written in a high-level programming language.

5. The compiler of claim 1, wherein said high-level programming language is object oriented.

6. The compiler of claim 1, wherein said program code is written in Java.

7. The compiler of claim 1, wherein said program code is written in one of C, C++, and C#.

8. The compiler of claim 1, wherein said program code is Java bytecode.

9. The compiler of claim 1, wherein said static verifier produces a type assertion for each dynamic check that is deferred.

10. The compiler of claim 9, wherein said static verifier produces an assertion table for storing said type assertions.

11. The compiler of claim 10, wherein said static verifier includes said assertion table in said object code.

12. The compiler of claim 1, wherein said static verifier produces said object code in a portable format capable of being used in a java virtual machine.

13. The compiler of claim 1, wherein said static verifier produces said object code in a portable format capable of being used in a managed execution environment.

14. The compiler of claim 1, wherein said runtime verifier performs at least one integrity check on said object code.

15. The compiler of claim 1, wherein said static verifier creates a type assertion for each dynamic check that is deferred.

16. The compiler of claim 15, wherein said runtime verifier examines said assertions and identifies any assertions that fail to verify.

17. The compiler of claim 15, wherein said assertion is an implicit downcast.

18. The compiler of claim 15, wherein said assertion is a predetermined static check failure assertion.

19. A method of compiling program code comprising:
receiving the program code by a complier stored on a computer storage medium of a computer;
performing static checks on the program code;
deferring dynamic checks on the program code;
producing object code containing information regarding the static checks and the dynamic checks; and
performing dynamic checks on the object code in a platform dependent environment,
wherein performing static checks includes checking the validity of different classes defined in the program code; and
wherein performing static checks includes creating a static failure assertion for any static check that fails.

20. The method of claim 19, wherein the program code is received in the form of one or more class files.

21. The method of claim 19, further comprising producing one or more shared libraries prior to performing dynamic checks.

22. The method of claim 19, further comprising performing at least one integrity check on the object code.

23. The method of claim 19, further comprising creating a type assertion for each dynamic check that is deferred.

24. The method of claim 23, further comprising storing said type assertions in an assertion table.

25. The method of claim 24, further comprising maintaining the assertion table within the object code.

26. The method of claim 23, further comprising testing each type assertion to determine if any fail to verify.

27. A method of compiling program code comprising:
receiving the program code within a runtime environment by a complier stored on a computer storage medium of a computer;
performing static checks on the program code;
generating one or more shared libraries;
compiling the one or more shared libraries to produce native code; and
executing the native code in the runtime environment
wherein performing static checks includes checking the validity of different classes defined in the program code; and
wherein performing static checks includes creating a static failure assertion for any static check that fails.

28. The method of claim 27, wherein executing the native code includes, if an error occurs:
performing dynamic checks on the native code within the runtime environment; and
attempting to execute the native code.

29. The method of claim 27, wherein executing the native code includes, if an error occurs:
performing static checks on the program code;
deferring dynamic checks until all static checks have been completed;
compiling the program code to produce object code;
performing the dynamic checks on the object code within the runtime environment; and
executing the object code.

30. A computer program product, stored on a computer storage medium, for use in compiling program code, said computer program product comprising instructions for causing a computer system to:
receive the program code within a runtime environment;
perform static checks on the program code;
generate one or more shared libraries;
compile the one or more shared libraries to produce native code; and
execute the native code in the runtime environment
wherein said static checks include validity checks on different classes defined in said program code to determine if said classes are valid; and
wherein a static failure assertion is created for any static check that fails.

31. The computer program product of claim 30, wherein a static check fails, and further comprising instructions for causing said computer system to:
defer dynamic checks on the program code until all static checks have been completed;
compile the program code to produce object code;
perform the dynamic checks on the object code within the runtime environment; and
execute the object code.

32. The computer program product of claim 30, wherein an error occurs while executing the native code, and further comprising instructions for causing said computer system to:
- perform dynamic checks on the native code within the runtime environment; and
- attempt to execute the native code.

33. The computer program product of claim 30, wherein an error occurs while executing the native code, and further comprising instructions for causing said computer system to:
- perform static checks on the program code;
- deferring dynamic checks until all static checks have been completed;
- compile the program code to produce object code;
- perform the dynamic checks on the object code within the runtime environment; and
- execute the object code.

34. A computer program product, stored on a computer storage medium, for use in compiling program code, said computer program product comprising instructions for causing a computer system to:
- receive the program code;
- perform static checks on the program code;
- defer dynamic checks on the program code;
- produce object code containing information regarding the static checks and the dynamic checks; and
- perform dynamic checks on the object code in a platform dependent environment
- wherein said static checks include validity checks on different classes defined in said program code to determine if said classes are valid; and
- wherein a static failure assertion is created for any static check that fails.

* * * * *